United States Patent [19]

Dominguez

[11] Patent Number: 4,469,657

[45] Date of Patent: Sep. 4, 1984

[54] RIM ELASTOMERS WITH IMPROVED CATALYST EFFICIENCY

[75] Inventor: Richard J. G. Dominguez, Austin, Tex.

[73] Assignee: Texaco Inc., White Plains, N.Y.

[21] Appl. No.: 416,825

[22] Filed: Sep. 13, 1982

Related U.S. Application Data

[63] Continuation-in-part of Ser. No. 119,705, Feb. 8, 1980, abandoned.

[51] Int. Cl.$^3$ .............................................. B29D 27/00
[52] U.S. Cl. .................................. 264/328.6; 264/50; 264/53; 264/DIG. 5; 264/DIG. 83; 521/126; 521/127
[58] Field of Search .................... 264/328.2, DIG. 83, 264/328.6, 50, 53, DIG. 5; 521/126, 127

[56] References Cited

U.S. PATENT DOCUMENTS

| | | |
|---|---|---|
| 2,683,730 | 7/1954 | Seeger et al. |
| 2,950,263 | 8/1960 | Abbotson et al. |
| 3,012,008 | 12/1961 | Lister. |
| 3,194,773 | 7/1965 | Hostettler. |
| 3,344,162 | 9/1967 | Rowton. |
| 3,362,979 | 1/1968 | Bentley. |
| 4,048,105 | 9/1977 | Salisbury ..................... 264/DIG. 83 |
| 4,055,548 | 10/1977 | Carleton et al. ............. 264/DIG. 83 |
| 4,102,833 | 7/1978 | Salisbury ..................... 264/DIG. 83 |
| 4,111,861 | 9/1978 | Godlewski ................... 264/DIG. 83 |

*Primary Examiner*—Philip E. Anderson
*Attorney, Agent, or Firm*—Robert A. Kulason; Jack H. Park; Kenneth R. Priem

[57] ABSTRACT

The invention is a method for making reaction injection molded polyurethane of improved properties and decreased catalyst usage. The product is formulated by placing the tin catalyst in the A-component (isocyanate component) rather than in the B-component (polyol side). Reaction injection molded elastomers are useful as molded articles of commerce including, but not limited to, vehicle body parts.

20 Claims, No Drawings

RIM ELASTOMERS WITH IMPROVED CATALYST EFFICIENCY

This application is a continuation-in-part of application Ser. No. 119,705 filed Feb. 8, 1980 now abandoned. This application is also related to application Ser. No. 417,260, filed Sept. 13, 1982.

BACKGROUND OF THE INVENTION

1. Field of the Invention

The invention concerns the field of reaction injection molded polyurethanes.

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials usually comprise a high molecular weight polyhydric polyether (polyol) and a low molecular weight active hydrogen containing compound (chain extender). After reaction and demolding, the parts may be subjected to an additional curing step which comprises placing the parts in an ambient temperature of about 250° F. or greater.

Usual practice is to place all components except the isocyanate in one vessel (polyol, chain extender, tin catalysts, amine catalysts, silicone surfactants, etc. called the B-component) and the isocyanate in another vessel (called the A-component) prior to reaction. Then the A- and B-components are mixed together in the desired stoichiometric balance in a mold as discussed above.

It has been surprisingly discovered that significant advantages occur when all of the tin catalyst is placed in the A-component prior to reacting the A- and B-components in the mold.

SUMMARY OF THE INVENTION

The invention is a method for making reaction injection molded polyurethane of improved properties with reduced catalyst usage. The product comprises the reaction product of a high molecular weight polyhydric polyether, a low molecular weight active hydrogen containing a compound of at least two functionality and a polyisocyanate in the presence of a single tin catalyst or a mixture of tin catalysts wherein two components are reacted together. One component contains all of the isocyanate. In the method of this invention, all of the tin catalyst is placed with the isocyanate component prior to reaction.

DESCRIPTION OF THE PREFERRED EMBODIMENTS

The polyols useful in the process of this invention include polyether polyols, polyester diols, triols, tetrols, etc., having an equivalent weight of at least 500, and preferably at least 1000 up to about 3000. Those polyether polyols based in trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

The chain extenders useful in the process of this invention are preferably difunctional. Mixtures of difunctional and trifunctional chain extenders are also useful in this invention. The chain extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain extenders including cyclic diols such as 1,4-cyclohexane diol and ring containing diols such as bis-hydroxyethylhydroquinone, amide or ester containing diols or amino alcohols, aromatic diamines and aliphatic amines would also be suitable as chain extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasiprepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

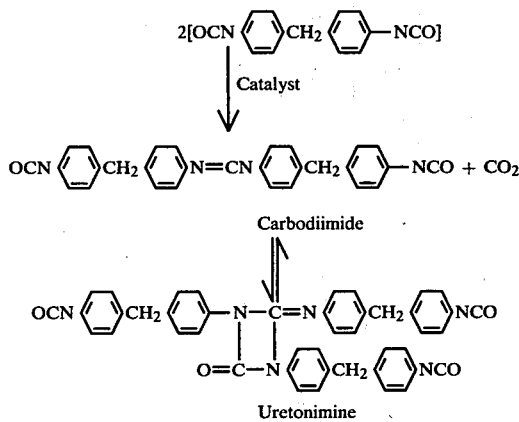

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

The RIM formulation includes a great number of other recognized ingredients such as additional cross-linkers-catalysts, extenders, blowing agents and the like. Blowing agents may include halogenated low-boiling hydrocarbons, such as trichloromonofluoromethane and methylene chloride, carbon dioxide, nitrogen, etc., used.

Catalysts such as tertiary amines or an organic tin compound or other polyurethane catalysts are useful. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. A single tin catalyst or a mixture of tin catalysts can be used. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture of two or more can be used.

Tertiary amine catalysts include trialkylamines (e.g. trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines, such as N,N,N',N'-tetramethyl-1, 3-butanediamine.

Other conventional formulation ingredients may also be employed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a particularly preferred embodiment, a high molecular weight polyether polyurethane polyol of about 5000 molecular weight or above is reacted with a polyisocyanate to form a reaction injection molded polyurethane part as follows: A B-component is prepared containing ethylene glycol chain extender, a silicone surfactant, an amine catalyst and most of the polyol. An A-component is prepared containing all of the polyisocyanate and a small portion of the polyol reacted with some of the polyisocyanate and all of a tin catalyst to be used in the formulation. The A- and B-components are mixed together in a RIM machine. After reaction of the A- and B-components, the resulting polyurethane part is post cured at a temperature of 325° F. for about one half of an hour. As will be shown in the data below, such a procedure causes a striking improvement in heat sag over procedures of the prior art where the tin catalyst is present in the B-component. The following examples demonstrate my invention. They are not to be construed as limiting the invention in any way, but merely to be exemplary of the improvement and manner in which the invention may be practiced.

A glossary of terms and materials used in the following examples follows the examples.

EXAMPLE I

A RIM elastomer was made using the following formulation. The tin catalysts (FOMREZ ® UL-29 and dibutyltin dilaurate) are in the B-component in the conventional manner.

B-Component

| THANOL ® SF-5505 | 16 pbw |
| Ethylene glycol | 6.44 pbw |
| L5430 Surfactant | 0.2 pbw |
| FOMREZ UL-29 | 0.025 pbw |
| THANCAT ® DMDEE | 0.25 pbw |
| dibutyltin dilaurate | 0.015 pbw |

A-Component

| THANATE ® Quasi-Prepolymer L55-0 | 5.33 pbw |
| ISONATE 143L | 27.45 pbw |

The above weight ratio yields an elastomer with an isocyanate index of 0.96. The properties are given in Table I.

EXAMPLE II

This example is the same as Example I except for two features: (a) the tin catalysts (FOMREZ UL-29 and dibutyltin dilaurate) are dissolved in the A-component rather than in the B-component (as in Example I), and (b) the total amount of tin catalyst is ½ that in Example I for each tin catalyst. This was also molded to a weight ratio appropriate for an Isocyanate index of 0.96. The properties are also given in Table I.

TABLE I
(Postcured at 325° F. for ½ hour)

| Material | Tin catalysts in B-Component, full standard level Example I | Tin catalysts in A-Component, ½ level Example II |
|---|---|---|
| Tensile, psi | 3874 | 4621 |
| Elongation, % | 167 | 177 |
| Tear, pli | 511 | 590 |
| Impact Resistance Izod ft. lb/in notch | 11.5 | 15 |
| Heat sag, in ½ hour at 325° F. 6" overhang | 2.81 | 1.5 |
| Reactivity Profile Cream/Rise/Tack free time in sec. | 6.0/7.0/6.5 | 5.0/6.0/5.5 |

The above comparison shows that the strength and heat properties of the elastomer made by the method of the invention (Example II) are superior to those of the elastomer made by the method of the prior art (Example I). Also, the reactivity profile of Example II is faster than Example I even though the amount of tin catalyst present in Example II is only 50% of that available in Example I. Thus, the improvements in reactivity profile and elastomer properties are clearly the result of having the tin catalyst in the A-component.

EXAMPLE III

A RIM elastomer was made using the following formulation. The tin catalyst (FOMREZ UL-29) is in the B-component in the conventional manner.

B-Component

| | |
|---|---|
| THANOL SF-5505 | 100 pbw |
| THANOL C-64 | 20 pbw |
| FOMREZ UL-29 | 1.0 pbw |

A-Component

| | |
|---|---|
| ISONATE 143L | 103.2 |

The above weight ratio yields an elastomer with an isocyanate index of 1.05. The properties are given in Table II.

EXAMPLE IV

This example is the same as Example III except for two factors: (a) the tin catalyst (FOMREZ UL-29) is dissolved in the A-component instead of the B-component, and (b) the total amount of tin catalyst is one-half that in Example III. The properties are given in Table II.

TABLE II

| Material | Example III | Example IV |
|---|---|---|
| Tensile, psi | 3400 | 3550 |
| Elongation, % | 220 | 220 |
| Tear, pli | 420 | 360 |
| Heat sag, in 1 hour at 250° F. | 0.31 | 0.38 |

The above comparison shows that the strength and heat properties of both elastomers are about equivalent. This is achieved in Example IV with only one-half of the catalyst of Example II dissolved in the A-component. This extends the practice of this invention to the sole use of FOMREZ UL-29, a stannic diester of a thiol acid.

EXAMPLE V

A RIM elastomer was made using the following formulation. The tin catalyst (M&T Catalyst T-11 which is stannous octoate) is in the B-component in the conventional manner.

B-Component

| | |
|---|---|
| THANOL SF-5505 | 100 pbw |
| THANOL C-64 | 20 pbw |
| M & T Catalyst T-11 | 1.0 pbw |

A-Component

| | |
|---|---|
| ISONATE 143L | 104.1 pbw |

EXAMPLE VI

This example is the same as Example V except for two features: (a) the tin catalyst (M&T Catalyst T-11) is dissolved in the A-component, and (b) the total amount of tin catalyst is one-half that in Example V. The properties are given in Table III.

TABLE III

| Material | Example V | Example VI |
|---|---|---|
| Tensile, psi | 3110 | 3370 |
| Elongation, % | 160 | 210 |
| Tear, pli | 355 | 375 |
| Heat sag, in 1 hour at 250° F. | 0.12 | 0.16 |

The above comparison shows that the strength properties of Example VI are superior to those of Example V. The heat properties are about equivalent. Example VI contains only one-half the catalyst of Example V; however, it is dissolved in the A-component in Example VI. This example extends this invention to stannous catalysts whereas the prior examples relate to stannic catalysts.

EXAMPLE VII

A RIM elastomer was made using the following formulation. The tin catalyst (dibutyltin diacetate, DBTDA) is in the B-component in the conventional manner.

B-Component

| | |
|---|---|
| THANOL SF-5505 | 100 pbw |
| THANOL C-64 | 20 pbw |

-continued

| | |
|---|---|
| DBTDA | 0.2 pbw |

A-Component

| | |
|---|---|
| ISONATE 143L | 104.1 pbw |

The above weight ratios yield an elastomer with an isocyanate index of 1.05. The properties are given in Table IV.

EXAMPLE VIII

This example is the same as Example VII except for two factors: (a) the tin catalyst (DBTDA) is dissolved in the A-component instead of the B-component, and (b) the total amount of tin catalyst is one-half that in Example VII. The properties are given in Table IV.

TABLE IV

| Material | Example VII | Example VIII |
|---|---|---|
| Tensile, psi | 3240 | 3400 |
| Elongation, % | 210 | 220 |
| Tear, pli | 380 | 400 |
| Heat sag, in 1 hour at 250° F. | 0.12 | 0.17 |

The above comparison shows that the strength properties of Example VIII are superior to those of Example VII. The heat properties are about equivalent. Example VIII contains only one-half the catalyst of Example VII; however, it is dissolved in the A-component in Example VIII. This example extends the use of this invention to another tin catalyst, DBTDA.

EXAMPLE IX

A RIM elastomer was made using the following formulation. The tin catalyst (FOMREZ UL-28, dibutyltin dilaurate) is in the B-component in the conventional manner.

B-Component

| | |
|---|---|
| MULTRANOL 3901 | 80 pbw |
| Diethyltoluenediamine (DETDA) | 17.7 pbw |
| FOMREZ UL-28 (DBTDL) | 0.5 pbw |

A-Component

| | |
|---|---|
| MONDUR PF | 46.8 pbw |

The above weight ratio yields an elastomer with an isocyanate index of 1.15. The properties are given in Table V.

EXAMPLE X

This example is the same as Example IX except for two factors: (a) the tin catalyst (FOMREZ UL-28) is dissolved in the A-component instead of the B-component, and (b) the total amount of tin catalyst is 0.4 times that in Example IX. The properties are given in Table V.

EXAMPLE XI

An internal mold release, Dow-Corning ®Q-2-7119 fluid, is added in the B-component of the formulation of Example X (0.72 parts). This mold release cannot be added to the conventional B-component (Example IX) because it contains tin catalyst. The mold release interacts negatively with the tin catalyst producing a very poor material. Also, the mold release cannot be added to conventional A-components since it loses its mold release qualities. Thus, to date it has only been used in 3-stream equipment. However, this is different than the standard 2-stream practice used today in RIM and would necessitate costly and time-consuming modifications. However, by adding the catalyst to the A-component as in Example X, these problems are avoided since the Q-2-7119 can be added to the B-component. In fact, this was done in this example. Whereas the mold must be waxed every time for conventional RIM elastomers, several shots can be shot into a mold without rewaxing with the elastomer of this example. In fact, four or five shots can be made without sticking. Also, the mold release improves the properties as can be seen in Table V.

TABLE V

| Material | Example IX | Example X | Example XI |
|---|---|---|---|
| Tensile, psi | 3430 | 3070 | 3000 |
| Elongation, % | 290 | 310 | 320 |
| Tear, pli | 390 | 380 | 360 |
| Heat sag, in 1 hour at 250° F. | 1.21 | 1.77 | 1.15 |

Although the above table shows that the properties of Example X are not quite as good as Example IX, they are almost as good and were achieved with only 0.4 times as much catalyst in Example IX. Also, this extends the practice of our invention to other chain extenders (DETDA) and isocyanates (MONDUR PF).

GLOSSARY OF TERMS AND MATERIALS

RIM—Reaction Injection Molding
Polyol—A di- or greater functionality high molecular weight alcohol composed of ether groups such as ethylene, propylene, butylene, etc., oxides.
MDI—4,4' diphenyl methane diisocyanate
ISONATE 143L—Pure MDI isocyanate modified so that it is a liquid at temperatures where MDI crystallizes—product of the Upjohn Co.
THANATE Quasi-prepolymer L-55-0—A quasi-prepolymer formed by reacting weights of ISONATE 143L and THANOL SF-5505.
THANOL C-64—A blend of 100 pbw ethylene glycol and 3.33 pbw PLURONIC ®F-98
THANOL SF-5505—A 5500 molecular weight polyether triol containing approximately 80% primary hydroxyl groups.
L5430 Silicone Oil—A silicone glycol copolymer surfactant containing reactive hydroxyl groups. Product of Union Carbide.
THANCAT DMDEE—Dimorpholinodiethylether
FOMREZ UL-29—A stannic diester of a thiol acid. The exact composition is unknown. Product of Witco Chemical Co.
Dow-Corning Q2-7119—An internal mold release agent comprising a dimethyl siloxane with organic acid groups. A product of Dow-Corning Corp.
MONDUR ®PF—High 4,4' containing MDI quasi-prepolymer. Product of Mobay.
MULTRANOL ®3901—Conventional 6500 molecular weight ethylene oxide capped polyether polyol. Product of Mobay.

I claim:

1. In a method for making a reaction injection molded polyurethane elastomer wherein a high molecular weight polyhydric polyether, a low molecular weight active hydrogen containing compound of at least two functionality and a polyisocyanate are reacted in the presence of a single tin catalyst or mixture of tin catalysts and wherein these ingredients are separated into two components prior to reaction and wherein one component contains all of the polyisocyanate the improvement which comprises
   mixing all of the tin catalyst or mixture of tin catalysts with the polyisocyanate component prior to reaction.

2. A method as in claim 1 wherein the polyol comprises a polyether of about 5000 molecular weight based on a trihydric initiator.

3. A method as in claim 1 wherein the polyisocyanate comprises 4,4'diphenylmethane diisocyanate.

4. A method as in claim 1 wherein the elastomer is postcured at about 325° F.

5. In a method for making a reaction injection molded polyurethane elastomer wherein a high molecular weight polyhydric polyether, a low molecular weight active hydrogen containing compound of at least two functionality and a polyisocyanate comprising 4,4'diphenylmethane diisocyanate are reacted in the presence of a single tin catalyst or mixture of tin catalysts and wherein these ingredients are separated into two components prior to reaction and wherein one component contains all of the polyisocyanate the improvement which comprises
   mixing all of the tin catalyst or mixing tin catalysts with the polyisocyanate component prior to reaction.

6. In a method for making a reaction injection molded polyurethane elastomer wherein a polyhydric polyether of about 5000 molecular weight based on the trihydric initiator, a low molecular weight active hydrogen containing compound of at least two functionality and a polyisocyanate comprising 4,4'diphenylmethane diisocyanate are reacted in the presence of a single tin catalyst or mixture of tin catalysts and wherein these ingredients are separated into two components prior to reaction and wherein one component contains all of the polyisocyanate improvement which comprises
   mixing all of the tin catalyst or mixture of tin catalysts with the polyisocyanate component prior to reaction.

7. A method as in claim 6 wherein the elastomer is postcured at about 325° F.

8. In a method for making a reaction injection molded polyurethane elastomer wherein a high molecular weight polyhydric polyether, a low molecular weight active hydrogen containing compound of at least two functionality and a polyisocyanate are reacted in the presence of a mixture of tin catalysts and wherein these ingredients are separated into two components prior to reaction and wherein one component contains all of the polyisocyanate the improvement which comprises
   mixing all of the tin catalyst mixture with the polyisocyanate component prior to reaction.

9. A method as in claim 8 wherein the polyol comprises a polyether of about 5000 molecular weight based on a trihydric initiator.

10. A method as in claim 8 wherein the polyisocyanate comprises 4,4'diphenylmethane diisocyanate.

11. A method as in claim 8 wherein the elastomer is postcured at about 325° F.

12. In a method for making a reaction injection molded polyurethane elastomer wherein a high molecular weight polyhydric polyether, a low molecular weight active hydrogen containing compound of at least two functionality and a polyisocyanate comprising 4,4'diphenylmethane diisocyanate are reacted in the presence of a mixture of tin catalysts and wherein these ingredients are separated into two components prior to reaction and wherein one component contains all of the polyisocyanate the improvement which comprises
   mixing all the tin catalyst mixture with the polyisocyanate component prior to reaction.

13. In a method for making a reaction injection molded polyurethane elastomer wherein a polyhydric polyether of about 5000 molecular weight based on the trihydric initiator, a low molecular weight active hydrogen containing compound of at least two functionality and a polyisocyanate comprising 4,4'diphenylmethane diisocyanate are reacted in the presence of a mixture of tin catalysts wherein these ingredients are separated into two components prior to reaction and wherein one component contains all of the polyisocyanate improvement which comprises
   mixing all of the tin catalyst mixture with the polyisocyanate component prior to reaction.

14. A method as in claim 13 wherein the elastomer is postcured at about 325° F.

15. In a method for making a reaction injection molded polyurethane elastomer wherein a high molecular weight polyhydric polyether, a low molecular weight active hydrogen containing compound of at least two functionality and a polyisocyanate comprising 4,4'diphenylmethane diisocyanate are reacted in the presence of a single tin catalyst and wherein these ingredients are separated into two components prior to reaction and wherein one component contains all of the polyisocyanate the improvement which comprises
   mixing all of the tin catalyst with the polyisocyanate component prior to reaction.

16. A method as in claim 15 wherein the polyol comprises a polyether of about 5000 molecular weight based on a trihydric initiator.

17. A metod as in claim 15 wherein the elastomer is postcured at about 325° F.

18. In a method for making a reaction injection molded polyurethane elastomer wherein a high molecular weight polyhydric polyether, a low molecular weight active hydrogen containing compound of at least two functionality and a polyisocyanate are reacted in the presence of a single tin catalyst and wherein these ingredients are separated into two components prior to reaction and wherein one component contains all of the polyisocyanate the improvement which comprises
   mixing all the tin catalyst with the polyisocyanate component prior to reaction.

19. In a method for making a reaction injection molded polyurethane elastomer wherein a polyhydric polyether of about 5000 molecular weight based on the trihydric initiator, a low molecular weight active hydrogen containing compound of at least two functionality and a polyisocyanate comprising 4,4'diphenylmethane diisocyanate are reacted in the presence of a single tin catalyst wherein these ingredients are separated into two components prior to reaction and wherein one component contains all of the polyisocyanate improvement which comprises
   mixing all of the tin catalyst with the polyisocyanate component prior to reaction.

20. A method as in claim 19 wherein the elastomer is postcured at about 325° F.

* * * * *